United States Patent [19]

Brooks et al.

[11] Patent Number: 4,947,569
[45] Date of Patent: Aug. 14, 1990

[54] DIALING CARD FOR TELEPHONES

[76] Inventors: Paul B. Brooks, 4102 Peakland Pl.; Robert E. Flippin, 1822 Clayton Ave., both of Lynchburg, Va. 24503

[21] Appl. No.: 293,500
[22] Filed: Jan. 4, 1989
[51] Int. Cl.⁵ ............................................... G09F 3/00
[52] U.S. Cl. ...................................................... 40/337
[58] Field of Search ................... 40/336, 337; 379/456, 379/457, 441, 447, 368, 369

[56] References Cited

U.S. PATENT DOCUMENTS

| | | | |
|---|---|---|---|
| D. 262,215 | 12/1981 | Obst | 40/336 X |
| 1,845,650 | 2/1932 | Cox | 40/337 |
| 1,896,352 | 2/1933 | Fiveash | 40/337 |
| 2,430,530 | 11/1947 | Muther | 40/337 |
| 2,512,457 | 6/1950 | Disken | 40/337 |
| 2,754,370 | 7/1956 | Gauvreau | 40/337 X |
| 2,808,668 | 10/1957 | Christin | 40/337 |
| 4,433,216 | 2/1984 | Isaacs | 40/336 X |

*Primary Examiner*—James R. Brittain
*Attorney, Agent, or Firm*—R. Lewis Gable

[57] ABSTRACT

An apparatus is disclosed for facilitating the dialing of a given telephone number on a push button type telephone having a fixed arrangement of push buttons. The apparatus illustratively takes the form of a card having a plurality of openings therethrough of a number equal to the number of push buttons and positioned according to the fixed arrangement thereof such that the card may be readily inserted over the telephone and its push buttons inserted through the openings. Each of the openings has a region adjacent the opening and uniquely colored to identify that opening and the push button inserted therethrough from all other push buttons. A plurality of separable elements having a variety of colors corresponding to those of the regions is provided. The card includes an area for receiving and mounting selected of the plurality of elements on the card, the elements being selected and arranged in a sequence on the card to represent the given telephone number.

6 Claims, 1 Drawing Sheet

DIALING CARD FOR TELEPHONES

FIELD OF THE INVENTION

This invention relates to an instruction aid for dialing a telephone and, more particularly, to a telephone dialing card in the nature of a template that is disposed over the face of a push button type of telephone, for guiding one, particularly children, in the correct sequence in which the push buttons are to be actuated.

BACKGROUND OF THE INVENTION

The invention relates to a dialing card for the common touch tone or push button type telephone. The prior art as exemplified by U.S. Pat. No. 1,541,786 of J. K. Burgess and U.S. Pat. No. 2,430,530 of A. Muther, have disclosed dialing cards for aiding the dialing of a telephone number by the use of numbering sequences. Both of these U.S. patents were particularly adopted for use with the rotary type of telephone. Basically, both of these patents suggest the rearrangement of numbers to a simpler more understandable form, yet numbers and their counting sequences still had to be understood and comprehended by the user of such dialing cards. A young child uneducated in numbers and counting sequences would be unable to use such a card. Further, these dialing cards could not be readily carried with you at all times.

It is understood that relatively young children recognize and comprehend differences in color, even before they can distinguish between numbers. For example, a young child could tell the difference between red and blue, and yet not distinguish the number 7 from the number 9.

Today, the telephone is a relatively simple device to use. However, young children find the complexity of dialing a telephone number overwhelming, especially at moments of stress. Children will frequently mix up numbers, forget telephone numbers or possibly not even know the phone number they wish to call. Children are sometimes lost or in need of contacting a parent. While telephones are readily available, the young child can not use a telephone, because he/she does not know how to dial the telephone number or even to remember his/her number.

SUMMARY OF THE INVENTION

It is therefor an object of this invention to provide a new and improved device in the nature of a card or template, which will assist those, typically children, to actuate the push buttons of the telephone in the desired sequence.

It is a more particular object of this invention to provide a new and improved telephone dialing card, which is capable of assisting those who are unable to distinguish alpha-numeric characters in actuating the push buttons of a telephone in the desired order according to a particular telephone number.

It is a still further object of this invention to provide a new and improved telephone dialing card, which uses a readily understandable indicia such as color as an aid in actuating the proper sequence of push buttons for a particular telephone number.

It is a still further object of this invention to provide a new and improved telephone dialing card, which is readily carried by a person and adapted to be used with a telephone set.

In accordance with these and other objects of this invention, there is described an apparatus for facilitating the dialing of a given telephone number on a push button type telephone having a fixed arrangement of push buttons. The apparatus illustratively takes the form of a card having a plurality of openings therethrough of a number equal to the number of push buttons and positioned according to the fixed arrangement thereof such that the card may be readily inserted over the telephone and its push buttons inserted through the openings. Each of the openings has a region adjacent the opening and uniquely colored to identify that opening and the push button inserted therethrough from all other push buttons. A plurality of separable elements having a variety of colors corresponding to those of the regions is provided. The card includes an area for receiving and mounting selected of the plurality of elements on the card, the elements being selected and arranged in a sequence on the card to represent the given telephone number.

In a further aspect of this invention, the plurality of separable elements are removably connected to each other and to the card.

In another aspect of this invention, the mounting area comprises a slot extending through the card. The slot is of a configuration to receive a selected number of the plurality of elements. The thickness of each of the elements does not exceed the thickness of the card, whereby the selected plurality of elements is retained within the slot.

DESCRIPTION OF THE DRAWINGS

While the specification concludes with claims particularly pointing out and distinctly claiming the subject matter of the invention, it is believed that the invention will be better understood from the following description taken in conjunction with the accompanying drawings, wherein:

DESCRIPTION OF THE PREFERRED EMBODIMENT

Figure 1:
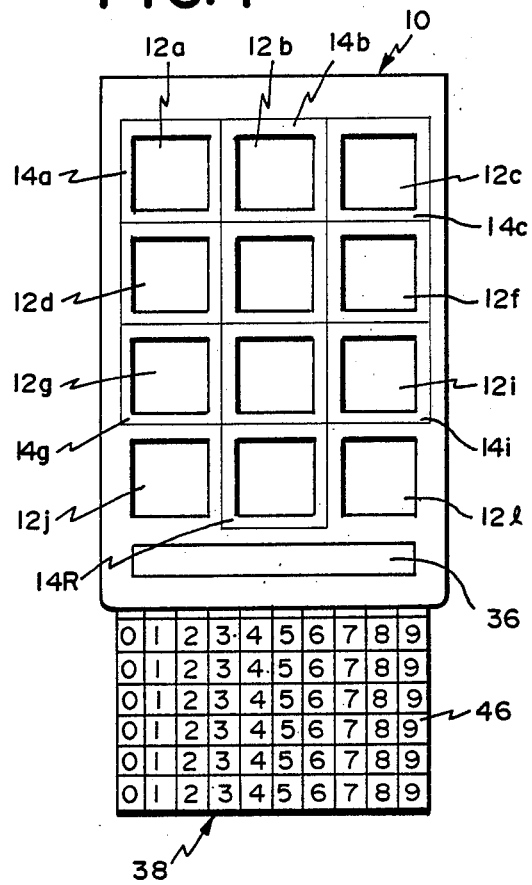
FIG. 1 is a plan view of the front of a telephone dialing card and its associated color sheet in accordance with the teachings of this invention.
Figure 2:
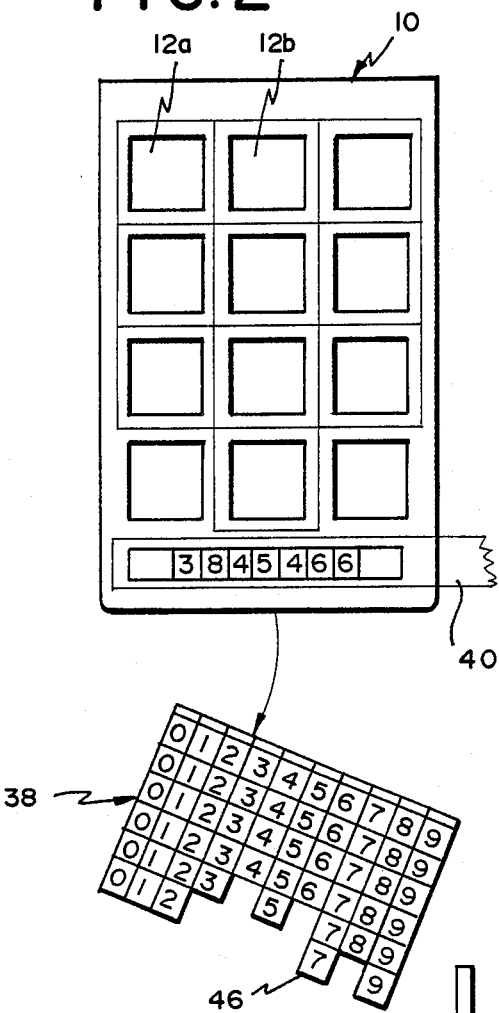
FIG. 2 is a plan view of the telephone dialing card shown in FIG. 1 illustrating the selection of the colored elements from the sheet and the insertion in the desired sequence within a designated area of the card.
Figure 3:
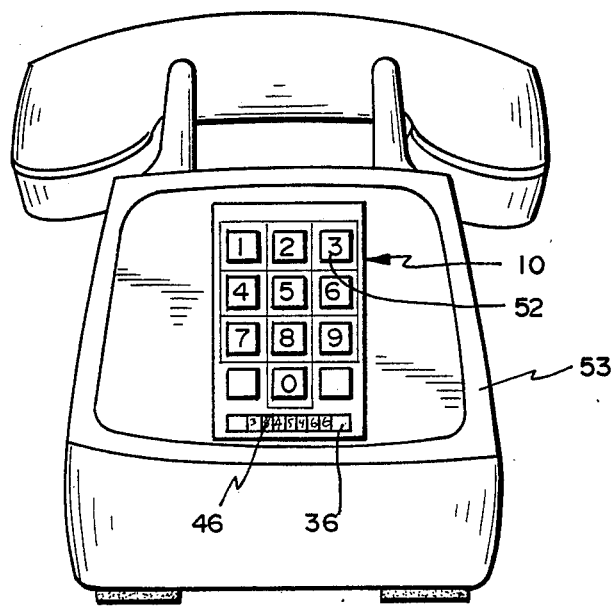
FIG. 3 shows how a telephone dialing card programmed in accordance with the teachings of this invention may be mated with a push button type of telephone in a manner to assist one in the actuation of the push buttons in a sequence according to the telephone number to be dialed.

A dialing card is shown in FIGS. 1 and 2 with twelve square holes 12a–12l positioned in a matrix of three by four holes. The twelve holes 12 are arranged to fit over the 12 telephone keys 52 of the common touch tone or push button type telephone. When this dialing card 10 is placed over the telephone keys 52 of a telephone 53 as shown in FIG. 3, the telephone keys 52 extend through the holes 12, whereby the keys 52 are available to be actuated for dialing a telephone number.

The dialing card 10 is provided with border regions 14 surrounding corresponding holes 12, whereby each hole 12 and thus the key 52 protruding therethrough may be uniquely identified by the characteristics of its border region 14. As the dialing card 10 is placed over the telephone keys 52, each key 52 is provided with its own unique border region 14. For example, each telephone key 52 has its own separate color whereby each key 52 is distinguishable from all of the other keys 52. In one embodiment, the bottom left and right (* and # key) holes have no color border around them because they are not used in the dialing procedure. No two colors making up the telephone keys region 14 are the same.

As shown in FIG. 1, the dialing card 10 also provides for a separate color sheet 38, which is attached to the dialing card 10. The color sheet 38 can be removed from the dialing card 10 as shown in FIG. 2. The sheet 38 is comprised illustratively of sixty separable elements 46 disposed in a matrix of ten elements 46 in a row and six elements 46 in a column. Each element 46 bears a color corresponding to the colors of the border regions 14 of the dialing card 10. Each element 46 of a column bears the same number and color. In the example shown, there are ten columns of elements 46, thus providing elements 46 bearing numbers 0-9. The color of an element 46 and the number printed thereon is selected to determine the sequence for dialing the telephone keys 52. Illustratively, six elements 46 on the color sheet 38 bear the same in color and have the same number printed thereon. In addition, there will be nine distinct colored and numbered elements 46. As an example, telephone key 52 bearing #1 will have a red border region 14a around it when the dialing card 10 is placed over the telephone keys 52. Thus, the six colored elements 46 of the color sheet 38 whose color is red 48 will have the number "1" printed thereon.

In a lower portion of the dialing card 10, a rectangular area 36 is formed having a length equal to widths of seven elements 46 and a width equal to the height of an element 46. The area 36 of the card 10 is adapted to receive and position seven elements 46 in an ordered sequence. The colored and numbered elements 46 may be separated, typically by cutting from the color sheet 38. The user will cut out the elements 46 from the sheet 38 that he/she needs in order to program the telephone number on the dialing card 1 0. The separated elements 46 are arranged in the rectangular area 36 in the desired sequence so that these colored number elements 36 indicate the telephone number when reading the numbers printed within the elements 46. Once arranged in the proper order within the rectangular area 36 the elements are held there in a fashion that will prevent the elements from being easily removed. This allows the arranged elements 46 to be held in place on the dialing card 10 and also keeps these colored number boxes protected.

Figure 4:
FIG. 4 s a side view of the card shown in FIGS. 1-3.

In a preferred embodiment of this invention, the rectangular area 36 comprises a slot extending through the entire width of the dialing card 10 as shown in FIG. 4. As shown particularly in FIG. 2, each element 46 is readily removable from its sheet and has a thickness corresponding substantially to that of the thickness of the card 10. In order to "program" the card 10, a first piece of transparent adhesive tape 40 is secured to the rear face of the card 10 and, thereafter, each element 46, starting with the first element corresponding to the first number of the telephone number to be dialed, is inserted within the area 36 in the further most left hand position, then available, as shown in FIG. 2. The element 46 corresponding to the next number is disposed in the next position immediately to the right of the first positioned element 46. In this way successive elements 46 are placed until the entire slot 36 is filled and the card has been "programmed." Thereafter, a second piece of transparent adhesive tape 40 is disposed on the top most surface of the card 10, whereby the elements are securely held within the region 36. By making the width of the elements 46 substantially equal to that of the card 10, the elements 46 will not protrude beyond the front and back surfaces of the card 10 and therefor will be held more securely therein. In an alternative embodiment of this invention, the rectangular area 36 may take the form of an area recessed less than the entire thickness of the card 10. In such an embodiment, the elements 46 would have an appropriate adhesive, whereby they would be secured to the bottom surface of the recessed area 36. In that embodiment, the thickness of the elements 46 is selected such that the top most surface of each element 46 does not protrude above the top surface of the card 10.

Once the dialing card 10 is programmed with the telephone number, it is ready to be used by the child at any time. To use the dialing card 10, the child places the dialing card 10 over the telephone keys 52 as shown in FIG. 3. The child now follows the color pattern shown in the rectangular area 36 of his/her dialing card 10. A child will push the telephone keys 52 which is surrounded by a border region 14, which has the same as the elements 36 shown in the rectangular area 36 of his/her dialing card 10. The child will push the telephone keys 52 in the same sequence as the elements 46 are arranged in the area 36.

An illustrative example will now be given. The border regions printed on the dialing card 10 are assigned the following numbers and colors:

| TELEPHONE KEY NUMBER | BORDER REGION | COLOR SEEN |
|---|---|---|
| 1 | 14a | RED |
| 2 | 14b | DARK PURPLE |
| 3 | 14c | ORANGE |
| 4 | 14d | YELLOW |
| 5 | 14e | DARK BLUE |
| 6 | 14f | DARK GREEN |
| 7 | 14g | PEACH |
| 8 | 14h | LIGHT BLUE |
| 9 | 14i | LIGHT GREEN |
| 0 | 14k | LIGHT PURPLE |

Significantly, the color assigned to an element 46 bearing a particular number corresponds to the color of the border region 14 surrounding the telephone key 52 of the same number. For example, a RED colored element 46 on the color sheet 38 would have "1" printed thereon; the sheet 38 comprises six RED elements 46. The ORANGE colored elements bears "3".

To further explain how the card 10 is used, an explanation will be given of how to program the card 10 for the telephone number 384-5466. With the telephone number in mind, the first element 46 is selected from the sheet. In this case, the first number is a three and an element 46 bearing an orange surface and the numeral 3 thereon is selected and placed in the first or further most left position within the rectangular area 36. Next the second element 46 bearing the numeral 8 and a light blue color is separated from the sheet 38 and is placed in the next position, immediately adjacent to the first orange element 46. In this fashion, elements 46 are successively separated from the sheet and are placed within the area 36 until all seven elements 46 have been selected and disposed in the area 36.

Thus, when the elements 36 have been selected and arranged in sequence in the rectangular area 36 of the dialing card 10, the colors presented by the elements 46 will appear in the following sequence: ORANGE, LIGHT BLUE, YELLOW, DARK BLUE, YELLOW, DARK GREEN and DARK GREEN. When these elements 46 are seen in that order on the dialing card 10 in the rectangular area 36, the numbers represented by the displayed colors will read: 3845466. Thus, we see that this dialing card 10 is programmed for the telephone number 384-5466 as used within this example.

To use, the dialing card 10 is placed over the telephone keys 52 as seen in FIG. 3 and the child is instructed prior to use, to follow the color pattern shown in the rectangular area 36, pushing the telephone keys 52 whose colored border is the same as the colored boxes in the program area 36 and, of course, following the same sequence of colors. For our example, the child shall push the telephone keys 52 whose colored border region 14 is as follows: ORANGE, LIGHT BLUE, YELLOW, DARK BLUE, YELLOW, DARK GREEN, DARK GREEN. When those telephone keys have been pushed, the child has in effect dialed the number 384-5466.

The dialing card 10 could be programmed for any telephone number and the telephone's area code number could be included if wished. The color sheet 38 provides for six of each color and numbered boxes to account for repeated numbers used in the telephone number.

It is understood that while color has been used as a means for identifying the telephone keys, any unique indicia that children understand could be substituted or replaced on the dialing card and color sheet as a means for distinguishing uniquely each telephone key from each other.

As a means of convenience, the dialing card 10 and color sheet 38 can be made from thin plastic material that would provide flexibility in the dialing card. This would allow the child to carry the dialing card 10 in her/his pocket or even within their shoe. If kept in a shoe, the dialing card 10 is placed above the tongue and below the shoe strings. This allows the dialing card 10 to be kept securely with the child in case of emergency. It is noted that the dialing card 10 and color sheet 38 could be made of paper, laminated paper, cardboard, plastic or any material suited for the formation of this card type template or dialing card.

Due to the fact that children associate with colors before numbers, color bordering is chosen in a preferred embodiment of this invention as most effective for ease of use. This is chosen with the understanding that other indicia could be used.

While children will find great benefit from the card 10, it will also prove to be an effective aid for the elderly or any person who has trouble remembering telephone numbers. An assortment of dialing cards could be placed beside the telephone at home to aid in calling commonly called telephone numbers or emergency telephone numbers. The dialing card could also be proven a benefit to the business community for purposes of advertising or promotion of their business. This would allow persons to call their business with ease.

In considering this invention, it should be remembered that the present disclosure is illustrative only and that the scope of the invention should be determined solely by the appended claims.

We claim as our invention:

1. A card universally programmable to facilitate the dialing of a selected one of a plurality of telephone numbers on a telephone having a given number of dialing elements disposed in a fixed arrangement, said selected one telephone number having a selected sequence of characters, said card having a plurality of openings therethrough of a number and arrangement corresponding respectively to said given number and said fixed arrangement of the telephone dialing elements, each of said openings having a region which is adjacent to said opening and bearing a unique color to identify only that opening and the corresponding dialing element of the telephone from all other of the given number of dialing elements of the telephone, and a number of separable indicia elements each bearing one of said unique colors wherein said plurality of separable indicia elements are removably connected to the card, said number of indicia elements being sufficiently large so that there is at least one indicia element bearing each unique color, and means for receiving and mounting said indicia elements in an order programmed in accordance with said given sequence of characters of said selected one telephone number.

2. The apparatus as claimed in claim 1, wherein said region constitutes a border of configurations similar to that of said openings and surrounding each of said openings.

3. The apparatus as claimed in claim 1, wherein said mounting means comprises a slot extending through said card.

4. The apparatus as claimed in claim 3, wherein said slot is of a configuration to receive a selected number of said plurality of indicia elements corresponding to said given sequence of characters.

5. The apparatus as claimed in claim 4, wherein the thickness of each of said elements does not exceed the thickness of said card, whereby said selected plurality of elements is retained within said slot.

6. The apparatus as claimed in claim 1, wherein said plurality of openings are disposed in rows and columns and being of a substantially square configuration, said regions being of a rectangular configuration and surrounding each of said openings.

* * * * *